Patented Oct. 19, 1948

2,451,782

UNITED STATES PATENT OFFICE 2,451,782

CAMERA FILM GATE THREADING MECHANISM

Herbert Charles Macleod Stevens, Taunton, England, assignor to Avimo Limited, Taunton, England Application April 16, 1946, Serial No. 662,466
In Great Britain May 4, 1945

2 Claims. (Cl. 88—17)

This invention relates to cameras of the kind adapted to contain a coiled length of film which is required to be traversed across an exposure aperture, and more particularly to cameras required for purposes of scientific research.

The object of the invention is to provide an improved gate by which the film is guided past the exposure aperture.

The invention comprises the combination of a pair of rollers adapted to be mounted in fixed positions and to receive rotary motion from a driving mechanism, a pair of rollers adapted to be moved towards or away from the first rollers, a spring loaded slidable member carrying the second rollers, and means operable by a finger piece for moving the said member in the direction for separating the two pairs of rollers.

Figure 1:
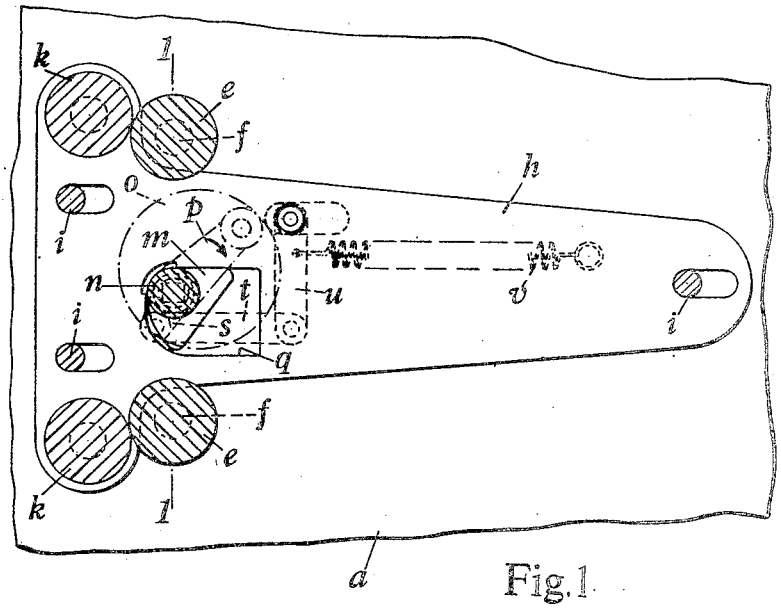
Figure 2:
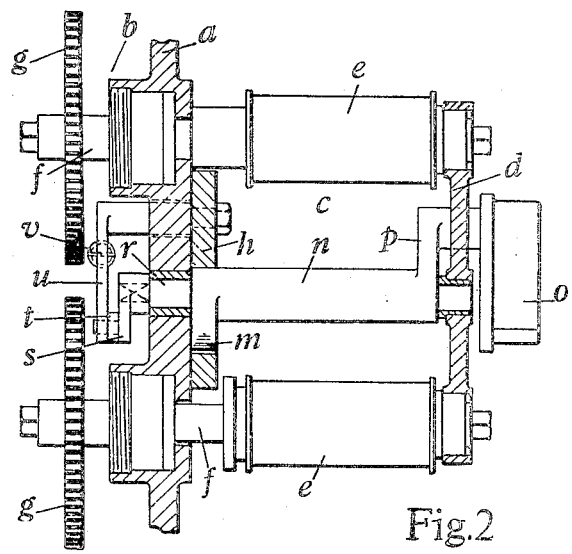

In the accompanying drawings:

Figure 1 is a sectional side elevation, and Figure 2 a sectional end elevation (through the line I—I, Figure 1), illustrating a film gate constructed in accordance with the invention.

Referring to the drawings, the camera casing is provided with a partition $a$ which separates the compartments $b$, $c$, the former containing the driving mechanism and the latter the film gate and the spools which carry the film. On one side of this partition is secured a bracket of any convenient form, a part of which is indicated by $d$ in Figure 2, and by means of this bracket and the said partition $a$ are supported a pair of (upper and lower) film rollers $e$. Each of the spindles $f$ extending from these rollers into the chamber $b$ has secured to it a driving wheel $g$, these wheels being actuated by the mechanism (not shown) contained in that chamber.

In contact with the same side of the partition $a$ which carries the bracket above mentioned is arranged a horizontally slidable member $h$. This member is supported by pegs $i$ extending from the partition $a$ into slots in the said member. At the end of the slidable member adjacent to the rollers $e$ are freely mounted complementary rollers $k$ which by co-operation with the rollers $e$ serve to grip the film which is caused to pass between them.

For separating the rollers prior to inserting or removing the film, a cam $m$ is used. This is formed on or secured to a member $n$ carried by the above mentioned bracket and partition (see Figure 2), and is rotatable by a finger piece $o$. In the example illustrated the finger piece is secured (at an eccentric position) to one end of an arm $p$ on the member $n$. The cam (the configuration of which is clearly shown in Figure 1) occupies a substantially rectangular gap $q$ in the slidable member, the lower left hand corner of the gap being rounded as shown in Figure 1. The part of the cam which co-operates with this corner is also rounded, but the upper side of the cam is made flat and is adapted to abut against the straight upper edge of the gap.

On the end of a spindle $r$ on the member $n$ which extends into the compartment $b$ is secured an arm $s$ to which is pivotally attached one end of a link $t$, the other end of the link being pivotally attached to an arm $u$. The latter is pivotally attached to the slidable member $h$ and is formed with a part which extends through a slot in the partition $a$ (Figure 2). A spring $v$ attached at one end to the partition and at the other end to the arm $u$, serves to hold the slidable member in its operative position and also to hold the flat part of the cam in contact with the upper edge of the gap in the said member.

To separate the rollers, the slidable member is moved to the left in opposition to the spring by rotating the finger piece in the direction of the arrow (Figure 1). This causes the rounded lower part of the cam to press against the rounded corner of the gap and so impart the desired movement to the slidable member. When rotated through 90° from the position shown in Figure 1, the cam not only imparts the desired movement to the slidable member for separating the rollers but holds the said member in its new position against the action of the spring. On returning the finger piece to its initial position, the cam allows the slidable member to be returned by the spring, the extent of this movement being determined by contact of the straight part of the cam with the upper edge of the gap.

By this invention I am able to provide a camera film gate in a very simple and convenient form.

Having thus described my invention what I claim as new and desire to secure by Letters Patent is:

1. A film gate for photographic cameras of the kind specified, having in combination a pair of rollers mounted in fixed positions, a slidable member formed with a gap having straight and curved edge portions, a second pair of rollers mounted on said member and movable thereby towards and away from the first mentioned pair of rollers, a loading spring whereby said member is movable in the direction for moving said second pair of rollers towards the other pair, a rotatable cam by which said member is movable in the opposite direction for moving said second pair of rollers away from the other pair, and which is arranged within the gap in said member, and a finger piece whereby said cam is operable, said cam having a flat portion which serves by abutting against a straight edge portion of said gap to limit the movement imparted to said member by said spring, and also having a rounded portion which serves by co-operation with a curved edge portion of said gap to move said member against the action of said spring into a position in which said cam prevents movement of said member by said spring.

2. A film gate as claimed in claim 1 and having in combination with the loading spring, a pivotal arm mounted on the slidable member and connected to one end of said spring, a fixed anchorage to which the other end of said spring is connected, and means including a link whereby said arm is connected to the cam.

HERBERT CHARLES MACLEOD STEVENS.

REFERENCES CITED

The following references are of record in the file of this patent:

UNITED STATES PATENTS

| Number | Name | Date |
|---|---|---|
| 1,846,569 | Owens | Feb. 23, 1932 |

FOREIGN PATENTS

| Number | Country | Date |
|---|---|---|
| 401,977 | Great Britain | Nov. 23, 1933 |
| 409,882 | Great Britain | May 10, 1934 |
| 548,319 | Germany | Apr. 15, 1932 |